United States Patent

[11] 3,571,736

[72] Inventor Lynn P. West
Raleigh, N.C.
[21] Appl. No. 790,950
[22] Filed Jan. 14, 1969
[45] Patented Mar. 23, 1971
[73] Assignee International Business Machines Corporation
Armonk, N.Y.

[54] DEMODULATOR FOR PULSE WIDTH MODULATED SIGNALS

5 Claims, 3 Drawing Figs.

[52] U.S. Cl. .......... 329/104, 329/106
[51] Int. Cl. .......... H03k 9/08
[50] Field of Search .......... 307/234; 328/112, 140; 329/104, 106, 107

[56] References Cited

UNITED STATES PATENTS 2,716,189 8/1955 Ayres .......... 329/104X
2,904,683 9/1959 Meyer .......... 329/104X

*Primary Examiner*—Roy Lake
*Assistant Examiner*—Lawrence J. Dahl
*Attorneys*—Hanifin and Jancin and Vincent W. Cleary

ABSTRACT: The subject disclosure relates to a frequency demodulator. The demodulator produces two pulse trains from the transitions which are square wave trains with one train being inverted with respect to the other. These transitions define "transition periods." During the first transition period, a capacitor is discharged so that at the end of that period, it provides a signal that is a function of the time width of the first odd transition period of the first train of square waves. During the second even transition period, another capacitor is discharged so that at the end of this period the capacitor provides a signal which is a function of the time length of the second transition period. Thus, the two trains provide alternately a voltage level that is a function of alternate transition periods. These signals are then added to produce a quantitized version of the frequency modulation.

*INVENTOR.*
LYNN P. WEST
BY Vincent N Cleary
ATTORNEY

DEMODULATOR FOR PULSE WIDTH MODULATED SIGNALS

BACKGROUND OF THE INVENTION

1. Field of Invention

Frequency modulators.

2. Description of the Prior Art

Prior demodulators have provided a hyperbolic waveform that is a function of the time between transitions. At the end of a sawtooth, the waveform is sampled by a short pulse and held to provide a form of quantitized waveform. These short pulses for sampling must occur at the same rate as the transitions and must be achieved by very fast switching. Since the sampling is done at the FM rate, the FM will feed through to the output unless rather expensive filtering is accomplished. The subject disclosure does not sample but rather operates on two trains of square waves to produce voltage levels. Consequently, when these two trains of square waves are added, fast switching is not required and, in addition, the feed through from the FM, if any, would be far less than prior demodulators. As a result of this feed through, filters were required that are not necessary in the demodulator disclosed herein.

SUMMARY OF THE INVENTION

It is an object of the invention to provide a new and improved demodulator.

A further object of the invention is the provision of a new and improved demodulator for frequency demodulation with a minimum of FM feed-through at the output of the demodulator.

A still further object of the invention is to provide a frequency demodulator with a minimum of filtering required at the output.

A still further object of the invention is the provision of a frequency demodulator, the output of which can be applied directed to a television monitor.

The above objects of the present invention are accomplished by a frequency demodulator that receives a train of pulses that define a plurality of pulse time periods. It further includes a first means which develops a first signal having portions that have an amplitude which is the function of the time length of even alternate pulse time periods. The demodulator further includes a second means which develops a second signal having portions that have an amplitude which is the function of the odd alternate pulse time periods. The respective portions of these two signals are then summed so that the output consists alternately of the first signal and then the second signal. Since there is no high speed sampling, as done in the prior art, at the FM rate or faster, there is no FM feed-through and, consequently, no necessity to employ respective filters to remove this feed-through.

GENERAL DESCRIPTION

Figure 1:
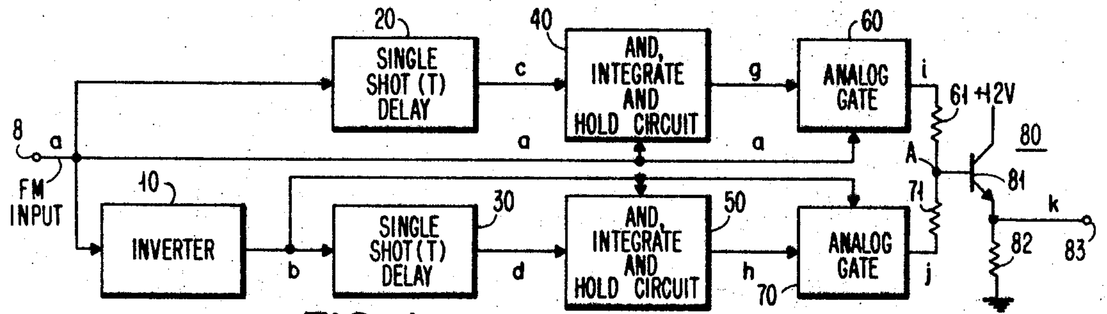
FIG. 1 is a schematic diagram partially in block form of a demodulator embodying the invention.
Figure 3:
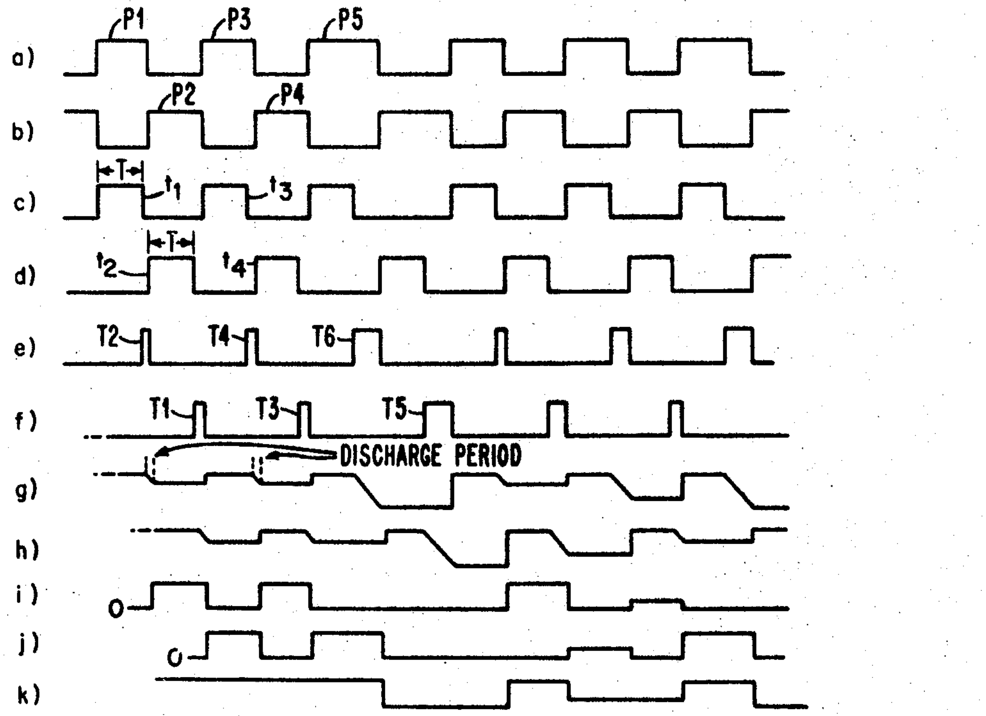
FIG. 3 illustrates waveforms useful in explaining the operation of the demodulator illustrated in FIG. 1.

The frequency modulation input, such as waveform *a* shown in FIG. 3 (a) is applied to the input terminal 8 of the demodulator circuit shown in FIG. 1. The positive rises of pulses *a* occurring during the odd intervals defined by the pulses width or duration of waveform *a* will trigger a single shot 20, the output of which is on for a predetermined time T as shown for the waveform in FIG. 3 (c), This time period T is selected to be only a portion of the pulse time periods normally defined by the rise and decay angles, and the width of the pulses. Both the output of the single shot 20 and the original pulses from the FM are applied to an AND integrating and holding circuit 40. Between time period T of the end of the square wave output of single shot 20 and the end of the positive pulses P1, P3, etc., defining the decay of the odd transition time periods, the circuit 40 will integrate by discharging a capacitor and during the even time periods P2, P4, etc., circuit 40 will have an output provided that is the function of the odd time periods P1, P3, etc. This output is applied to the analogue gate 60 which allows the output of the integrating circuit 40 to pass to a summing point A during the even transition periods.

The FM input *a* is also applied to an inverter 10 to provide an output signal *b* shown in FIG. 3(b). Output *b* is then applied to a single shot 30 which provides an output *d* shown in FIG. 3(d) that also has a time length of T. Both single shots 20 and 30 are on the same length of time T. During the time period between the end of the output of the single shot 30 and the end of an even transition time period P2, P4, etc., the circuit 50 integrates by discharging a capacitor with the integrating ending at the end of the even transition time periods. The output of the circuit 50 (the capacitor) is then held during the odd transition time periods, and the analogue gate 70 allows the signal from 50 to pass to point A during the odd time periods. Thus, the output signal is taken from the circuit 40 during the even transition time periods and from the circuit 50 during the odd transition time periods. In this manner, by developing the signal during every other time period while the other circuit is providing the signal, there results a minimum of feed-through of the FM. It will be understood that the invention can be utilized by omitting the single shots 20 and 30, and merely integrating during the whole time period. The single shots 20 and 30, however, result in more noise free detection, where the deviation ratio $\Delta f/f_t$ *m is small.*

SPECIFIC DESCRIPTION

Figure 2:
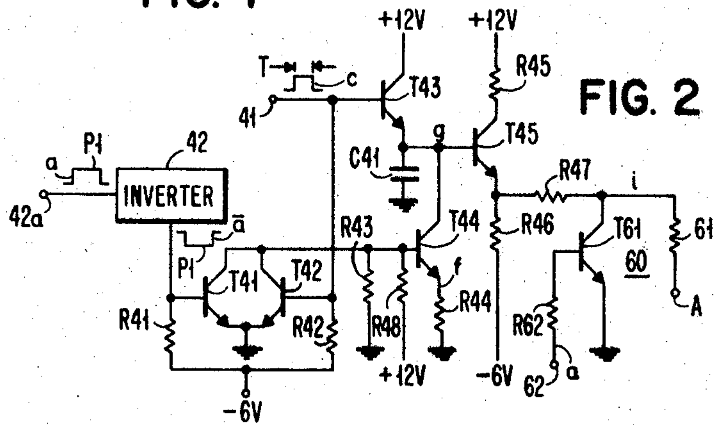
FIG. 2 is a schematic diagram of the AND integrating and holding circuit 40 and 50 shown in FIG. 1.

The waveforms (a) through (d) and (f) through (k) in FIG. 3 are the waveforms at positions a through *d* and *f* through *k*, respectively, shown in FIGS. 1 and 2. The waveform (e) represents the correlative circuit position of waveform (f) in the circuit of FIG. 2, but for the circuit block 50 instead of for the circuit block 40 (FIG. 2). As stated above, the FM input *a*, shown in FIG. 3(a) is applied to the input terminal 8, and thence to single shot 20. In FIG. 3, (a) the odd transition time periods defined by the FM are illustrated as P1, P3, P5, etc. The leading edges of these positive going pulses P1, P3, P5, etc., occurring at the beginning of the odd time periods, turn on the single shot delay 20 to produce an output shown as waveform (c) in FIG. 3. Single shots 20 and 30 are only sensitive to positive going leading edges and they are not responsive to negative going trailing edges. These output pulses $t_1$, $t_3$, etc. of waveform (c) are selected to last for the time period T, as shown in FIG. 3(c), which is less than the time periods between the transitions of the pulses P1, P3, etc. The FM input is also applied to inverter 10, which produces the output waveform (b) shown in FIG. 3(b), so that there are positive going pulses during the even alternate transition time periods as illustrated as P2, P4, etc. The leading edge of these positive going pulses triggers the single shot 30, which produces pulses $t_2$, $t_4$, etc. having a time period T that is the same time duration as for pulses $t_1$, $t_3$, etc.

If, as stated above, between the end of pulses $t_1$, $t_3$, etc. from the single shot 20 and the end of the corresponding odd time period P1, P3, etc. that is, during the time periods T1, T3, T5, etc. as shown in FIG. 3(f), the AND integrating and holding circuit 40 integrates. During the even time periods, the output which results in the integration from circuit 40 is held by circuit 40 and gated by analogue gate 60 to the summing point A.

During the time period between the end of pulses $T_2$, $T_4$, etc. at the output of the single shot 30 and the end of the corresponding even time period P2, P4, etc. the AND integrating and holding circuit 50 integrates by discharging a capacitor. The output resulting from this integration is held during the odd time periods and gated by analogue gate 70 during the odd time periods to the summing point A. The circuits 40 and 50 are identical in the preferred embodiment as are the gates 60 and 70. Therefore, the details of only circuit 40 are shown and illustrated in FIG. 2.

The output (e) of the single shot delay, 20 is applied to the base of the transistor T43 through terminal 43*a*. The emitter of the transistor T43 is connected to ground through a charging capacitor C41. Transistor T43 is held on by the pulses $t_1$, $t_3$, etc. shown in FIG. 3(c). During this time period T the current through emitter of T43 then maintains the charging capacitor C41 completely charged. T43 has its emitter connected in an emitter follower relationship to the base of the buffer transistor T45, which has collector resistor R45 connected to a positive 12 volt collector supply. The emitter of transistor T45 is connected through an emitter follower resistor R46 to a negative 6 volt bias supply.

The FM input for waveform (a) is also connected through terminal 42*a* to an inverter 42 that inverts waveform (a) to produce waveform $\bar{a}$. The inverter 42 applies waveform $\bar{a}$ to the base of transistor T41 with the base of T41 being connected through a resistor R41 to a negative bias supply of minus 6 volts. The base of transistor T42 is connected through a resistor R42 to the same negative 6 volt bias supply. The transistors T41 and T42 have their collectors connected directly together, as well as their emitters, which are grounded. The collectors of T41 and T42 are also connected to the base of transistor T44 which is connected through a resistor R48 to a bias supply of +12 volts. In addition, the base of transistor T44 is connected through a resistor R43 to ground. The emitter of transistor T44 is connected through a resistor R44 to ground. Transistor T44, when turned on, acts to discharge capacitor C41 and the collector of T44 is connected to the base of T45, capacitor C41 and the emitter of transistor T41.

The waveform (c) shown in FIG. 3(c) is applied to the base of transistor T42. Further, as stated, the waveform (a) shown in FIG. 3(a) is applied inverted to the base of T41. Both waveforms $\bar{a}$ and (c) are two level or binary type waveforms. If waveform $\bar{a}$ is at its low level, it will result in T41 being turned off or nonconductive. If waveform (c) is at its low level, it will result in T42 being turned off or nonconductive. If waveform (c) is at its high level, T42 will conduct. If either T41 or T42 is conducting, the potential of the base of T44 will be lowered (near ground) sufficiently so as to prevent T44 from conducting. If, however, both T4 and T42 are turned off or nonconductive, the transistor T44 will be turned on (due to 12V bias connected to R48, which is connected to the base of T44), thereby discharging capacitor C41.

Thus, during occurrence of pulses $t_1$, $t_3$, etc., (or high level of waveform *c*) T43 will be on, quickly, charging capacitor C41 at the beginning of pulses $t_1$, $t_3$, etc. Furthermore, during occurrence of pulses $t_1$, $t_3$, etc., these pulses render T42 conductive and thus render T44 nonconductive. During occurrence of $t_1$, $t_3$, etc., T41 is rendered nonconductive by the low level of waveform $\bar{a}$. Between the end of pulses $t_1$, $t_3$, and the end of the corresponding period P1, P3, etc., transistors T41 and transistor T42 are nonconductive and T44 is conducting, thereby discharging capacitor C41 an amount depending on the length of this time period. These discharging periods are defined by pulse T1, T3, etc., of waveform (f) shown in FIG. 3(f). At the end of the time periods T1, T3, etc., T41 will be turned on (by waveform $\bar{a}$) until the next odd time period P1, P3, etc., thus turning off T44 until that time. It will be noted that T42 conducts only during the occurrence of pulses $t_1$, $t_2$, etc., as does also transistor T43.

Transistor T45 is a buffer and draws virtually no current from capacitor C41 due to the high input impedance of transistor T45. T45 provides an output that is a function of the charge on C41. A 2N918 transistor type may be used as a suitable transistor for T45. The emitter of T45 is connected through resistor R47 to the collector of transistor T61.

The analogue AND gate 60 comprises a transistor 61 with the signal a being applied through resistor R62 to the base of the transistor T61. During the odd transition time periods, transistor T61 will be conductive, shorting to ground any outputs from transistor T45 due to the positive going pulses during periods P1, P3 and P5 being applied to the base of transistor T61. Thus, during these periods no output will be applied from T45 to point A. During the odd transition time periods, P2, P4, etc., this transistor T61 will not be rendered conductive by waveform (a) and the output of transistor T45, which is a function of the charge on capacitor C41, will be applied through a resistor 61 to a summing point A.

The AND integrate and hold circuit 50 and gate 70 are identical in structure to the units 40 and 60, respectively, illustrated in FIG. 3. The signals applied thereto, however, are different. The corresponding input terminal 41 would have the waveform (d) applied thereto from the output of single shot 30. The input terminal of circuit 50 corresponding to input terminals 42*a* and 62 would have the waveform (b) from inverter 10 as illustrated in FIG. 3(b) applied thereto. As a result of these connections, the capacitor C41 would be charged by the transistor T43 during the beginning of the even transition time periods P2, P4, etc., and discharged from the end of the output pulses $t_2$, $t_4$, etc., of single shot 30 and the end of the even periods P2, P4, etc. This discharge period is illustrated by the pulses T2 and T4, during which transistor T44 conducts. During T2, T4, etc., the capacitor corresponding to capacitor C41 will be discharged. The gate 70 will be the same as gate 60; however, it will have the waveform (b) illustrated in FIG. 3(b) applied thereto so that the analogue gate 70 will be conducting during even time periods P2 and P4, etc., to prevent the output of circuit 50, from being applied through resistor 71 to the summing point A during the even time periods. During the odd time periods P1, P3, etc., the transistor of gate 70 will not be conducting and, therefore, the output of AND integrating and holding circuit 50 will be applied through the resistor 71 to summing point A.

The signal waveform (i) applied through resistor 61 to point A is illustrated in FIG. 3(i). The signal waveform (j) applied through resistor 71 to point A is illustrated in FIG. 3(j). The lowest level of both of the waveforms is zero and occurs when transistor T61 in gate 60 conducts and when a similar transistor in gate 70 conducts.

The summing point A is connected to an emitter follower 80. More particularly transistor 81 has its emitter connected through a resistor 82 to ground with an emitter follower output terminal 83. The output waveform (k) of this is illustrated in FIG. 3(k).

OPERATION OF THE INVENTION

The FM input shown in waveform (a) is applied to the input terminal 8 and is illustrated in FIG. 3(a). This input defines time periods referred to as alternate odd transition time periods P1, P3, p5, etc., and alternate even transition time periods P2, P4, etc. The waveform shown in FIG. 3(a) is applied to the single shot 20 with the leading edges of P1, p3, etc., starting the time periods. P1, P3 and P5 trigger the single shot delay 20 so as to be turned on as shown in FIG. 3(c) for a predetermined time period T (pulses $t_1$, $t_3$, etc.). The output of this single shot is applied to the transistor T43 (of circuit 40) so that these positive going pulses turn on this transistor, resulting in fully charging capacitor C41. The original FM shown in FIG. 3(a) is applied to inverter 42 to produce a waveform $\bar{a}$ that is applied to the base of transistor T41. The pulses shown in FIG. 3(c) are also applied to the base of T42. This results in both T41 and T42 being off during periods defined by pulses T1, T3 and T5, thus raising the potential on the base of transistor T44 so as to turn this transistor on during the period defined by pulses T1, T3 and T5. This results in the discharge of capacitor T41 through transistor T44 during the time periods of pulses T1, T3 and T5, which time periods are a function of the time width of the transition periods P1, P3 and P5 less the time period T. Thus, the discharge of the capacitors during this time period is, in effect, an integration although integrators are generally charging capacitors. The same effect is obtained by discharging. The charge is on the capacitor C41 as shown in FIG. 3(g). The discharge periods of the capacitor are also illustrated. The partially discharged capacitor C41 maintains its level during the even time periods as shown in FIG. 3(g), which level is a function of the previous odd transition time period. This level is maintained, since transistor T44 is no longer on, nor is transistor T43 on. Transistor T45, during this period, draws virtually no current from capacitor C41 due to its high input impedance. Furthermore, during these even transition time periods, transistor T61 is not conducting since the pulses applied to T61 from waveform (a) are no longer highly positive. Thus, a signal is applied to summing point A during the even transition time periods from T45 which signal has a level from C41 which is a function of the length of the previous odd transition time period (less the time period T).

As stated above, the AND integrating and holding circuit 50 is identical to the circuit 40 except that the terminal corresponding to input terminal 41 has the output of single shot 30 (waveform d) connected thereto. In addition, the input terminal corresponding to the input terminal 42*a* and terminal 62 has the inverter 10 (i.e. waveform "b") connected thereto so as to receive the waveform illustrated in FIG. 3(b). The output of the single shot 30 is illustrated in FIG. 3(d) and the pulses T2, T4 and T6 are produced similarly to T1, T3 and T5 so as to effect discharging of a capacitor similar to C41 during this period. Thus, contrary to circuit 40, integration and/or discharge of a capacitor occurs during the even transition time periods and more specifically, during the pulses T2, T4 and T6. After the end of one of the pulses P2, P4, etc., and during the odd transition time period, this integrated output will be held and gated into the summing point A through resistor 71. This gating is effected by the waveform (b) shown in FIG. 3(b) being applied to the analogue gate 70 so as to effect passing of the waveform (j) shown in FIG. 3(j) during the odd transition time periods to output 80.

Thus, it is seen that during the odd transition time periods, the integrated output from 50 is applied to summing point A while the circuit 40 is integrating and the output of 40 and 60 is not being applied to summing point A. During the even transition time periods the integrated output of 40 is applied to the summing point A while circuit 50 is integrating. The output of analogue gate 60, as shown in FIG. 3(i) and the output of analogue gate 70, as shown in FIG. 3(j), are shown as summed outputs in FIG. 3(k).

Thus, it is seen that the high speed sampling is not required as in previous circuits where only one signal is developed. Therefore, expensive filters are not necessary in the embodiment of this invention. On the contrary, all that is required is a comparatively slow switching from one DC level to another. It has been found that by so producing a quantized video signal, no filters are required to prevent FM feed through and the signal can be directly supplied to a television monitor.

Referring to page 8, line 11, if $\bar{a}$ is at its high level, T41 will conduct.

While the invention has been particularly shown and described with reference to a preferred embodiment thereof, it will be understood by those skilled in the art that the foregoing and other changes in form and details may be made therein without departing from the spirit and scope of the invention.

I claim:

1. A circuit for demodulating a frequency modulated input signal having:
   - a train of pulse widths, said pulse widths defining a plurality of alternative odd and even transition time periods;
   - first means developing a first signal with portions of said signal having amplitudes developed as a function of the time length of even alternate transition time periods;
   - second means developing a second signal with portions of said signal having amplitudes developed as a function of the time length of odd alternate transition time periods; and
   - means summing the portions of said first and said second signals, thereby to provide an output consisting alternately of said first signal and said second signal.

2. A circuit as set forth in claim 1 wherein said first means develops said first signal during the even alternate transition time periods and holds the same amplitude during the odd alternate transition time periods; and said second means develops the second signal during the odd alternate transition time periods and holds its amplitude during the even alternate transition time periods.

3. A circuit as set forth in claim 2 wherein said summing means includes gating means to alternately apply to the output, said first signal during the odd alternate transition time periods and said second signal during the even alternate transition time periods.

4. A circuit as set forth in claim 3 wherein said first means develops said first signal having an amplitude which is a function of the time length of even alternate transition time period less a constant time length and said second means develops said second signal, the amplitude of which is a function of the time length of odd alternate transition time periods less a constant time length.

5. A circuit as set forth in claim 4 wherein said first means includes an integrator for integrating the time length of even alternate transition time periods less a constant time length and said second means includes an integrator for integrating the time length of odd alternate transition time periods less a constant time length.